United States Patent [19]

Andrew

[11] Patent Number: 5,077,448
[45] Date of Patent: Dec. 31, 1991

[54] FUSE FAULT PROTECTION SHIELD

[76] Inventor: Philip B. Andrew, 8 Park Lane, Charlottetown, P.E.I., Canada, C1A 4T4

[21] Appl. No.: 459,644

[22] Filed: Jan. 2, 1990

[30] Foreign Application Priority Data

Jun. 28, 1985 [CA] Canada .................................. 486173

[51] Int. Cl.$^5$ ............................................. B25B 29/00
[52] U.S. Cl. .................... 174/5 R; 81/53.1; 174/40 R; 219/147; 294/131
[58] Field of Search ................................. 174/5 R, 40; 29/DIG. 56, DIG. 86; 51/268, 269, 272; 74/608; 81/3.8, 53.1; 109/49.5; 144/251 R, 251 A; 160/351, 368.1; 219/147; 266/903; 294/19.1, 131; 296/96.21; 337/168, 171, 172, 199, 205; 248/125, 230, 231.2, 231.8, 541; 408/241 G, 710; 409/134; 422/104

[56] References Cited

U.S. PATENT DOCUMENTS

| 1,111,380 | 9/1914 | Hanke | 81/3.8 |
|---|---|---|---|
| 1,147,425 | 7/1915 | Ojala | 294/131 X |
| 1,217,838 | 2/1917 | Schmidt | 51/268 X |
| 1,408,970 | 3/1922 | Ayer | 248/231.8 |
| 1,665,513 | 4/1928 | Thomas | 2/10 |
| 1,994,938 | 3/1935 | Bott | 81/3.8 X |
| 2,350,207 | 5/1944 | Wyscaver | 294/131 X |
| 2,382,147 | 8/1945 | Hanak | 74/608 X |
| 2,454,513 | 11/1948 | Honey | 51/272 |
| 2,694,330 | 11/1954 | Davies et al. | 294/131 X |
| 2,772,450 | 12/1956 | Stewart | 109/49.5 X |
| 2,941,769 | 6/1960 | Alpard | 248/230 X |
| 4,230,357 | 10/1980 | Bosch et al. | 81/53.1 X |
| 4,397,491 | 8/1983 | Anderson | 294/131 X |
| 4,543,021 | 9/1985 | Adler | 51/272 X |

FOREIGN PATENT DOCUMENTS 89628 11/1960 Denmark ................................ 51/272

Primary Examiner—Leo P. Picard
Assistant Examiner—D. A. Tone
Attorney, Agent, or Firm—McFadden, Fincham, Marcus & Anissimoff

[57] ABSTRACT

A shield member for attachment to a conventional insulative line stick as used by power linesmen and other electrical staff working on high voltage distribution lines protects the user of a line stick when closing cutout assembly doors and engaging in similar activities. The shield member protects against the ejection of fuses or the blowing out or explosion of fuses. The shield member, in the form of a plate, clips onto the line stick, for example, by spring clip members attached to one arm of a bracket, another arm of the bracket being attached to the shield member.

6 Claims, 1 Drawing Sheet

FUSE FAULT PROTECTION SHIELD

BACKGROUND OF THE INVENTION

1. Field of the Invention

This invention relates to a safety device or shield and also to an insulative line stick for use by linesmen and other electrical personnel working on high voltage distribution lines and the like.

On high voltage electric power distribution lines, it is often necessary to close cut-out doors or fuse holders forming part of a conventional cut-out assembly Under power conditions, particularly under overload conditions, fuses can be ejected, or the fuses may blow or explode during the closing procedure. This can be dangerous, causing injuries to the personnel concerned.

2. DESCRIPTION OF THE PRIOR ART

In the prior art, there are numerous references which describe shields. For example, reference may be made to the following United States patents, namely:

1,665,513 - THOMAS (1928) ; and
1,217,838 - SCHMIDT (1917)

The above references teach adjustable protective eye shields. However, the transparent shields are not taught as being heat or break-resistant, nor could they be adapted for use with a line stick. In U.S Pat. No. 1,665,513 - Thomas, the device is taught as being attached to head covers rather than tools, and its object is to merely protect the user from harsh light. The shield disclosed in U.S. Pat. No. 1,217,838 - Schmidt, is frictionally retained on its support by spring jaws. However, there is no provision for electrically insulative attachment means. In addition, the shield members of the above references are not taught as having a tapered shape, which is desirable when a line stick is used to close cut-out doors, as described further hereinafter.

BRIEF SUMMARY OF THE INVENTION

The present invention provides a shield for clipping to a conventional line stick as is used for closing cut-out doors. The shield protects against ejected fuses, and against ejected disintegrated parts if a fuse blows or explodes.

Broadly, the invention comprises a shield member for attachment to a line stick, extending generally normal thereto, and means for releasably attaching this shield member to the line stick. One convenient way of attaching the shield member is by means of a bracket having two arms generally at a right angle relative to each other, one arm being attached to the shield member and spring clip members being mounted on the other arm of the bracket. The shield member is preferably of a high-strength, heat and break-resistant material. The shield member and bracket could be of a unitary or one piece construction.

In greater detail, the device of the present invention utilizes a shield member, which is intended to protect a person in the event of a fuse blowing or exploding while that individual is effecting line repairs. To this end, the shield member is preferably transparent to permit a person to visually determine the repair operation while being protected by the shield. Although the shield may have various configurations, preferably the shield has a first pair of opposed tapering sides, and a second pair of opposed end sides One side of the second pair of end sides can have a generally arcuate configuration, while the opposed end of the second pair is preferably straight. By providing the plate or shield member with a first pair of opposed tapering sides and an arcuate end, additional protection from a wider trajectory of expelled debris in the event of a fuse exploding is provided.

The shield member, preferably of a plastic material, can be made of any conventional material which is heat- and break-resistant; thus, various transparent polymers may be used for this purpose. Typically, the thickness of the shield member will depend on the type of polymeric material employed, generally with thicknesses in the range of about ⅛" to about ½" being appropriate.

As noted above, the shield member is adapted to be mounted to a bracket, which has a pair of arms angularly disposed, one relation to the other. In most cases, the angular disposition will be approximately 90°, although this may vary depending on the type of bracket used, and as well, the type of pole member or line stick that is used. Preferably, the bracket is a rigid, one-piece member which may be of suitable plastic or metallic material In one embodiment of the present invention, the bracket and the shield member may be formed as one piece, while in other cases, a separate bracket may be employed, which is securably attached to the shield member by suitable means. The bracket member may be provided with suitable apertures for attachment to the shield member with screws, bolts, or the like; alternatively, appropriate adhesives or heat-welding techniques (in the case of a plastic) can be employed for that purpose.

With the bracket, one arm is preferably mounted to the shield member, and the other arm is utilized for mounting spring clip members for attaching the device to a pole mounting member in a releasable manner. As will be understood by those skilled in this art, the conventional line stick is normally an insulative, elongated pole member used in performing repair or other operations for distribution lines, so that the end of the pole member may carry one or more tools. Thus, a conventional pole member which is used for effecting repairs or for carrying out various operations for distribution lines is preferably used in conjunction with the present invention, whereby the device of the present invention is releasably attached to the pole member. To this end, various types of releasable mounting means may be employed, although it is preferred that spring clip members, which are readily available, be utilized for this purpose. At least one such member is preferably employed; however, two or more such spring clip members may be utilized in the construction of the device of this invention, to provide a more secure mounting for the shield to the line stick.

BRIEF DESCRIPTION OF DRAWINGS

Having thus generally described the invention, reference will now be made to the accompanying drawings, which illustrate preferred embodiments only of the invention, and in which.

DETAILED DESCRIPTION OF PREFERRED EMBODIMENTS

Figure 1:
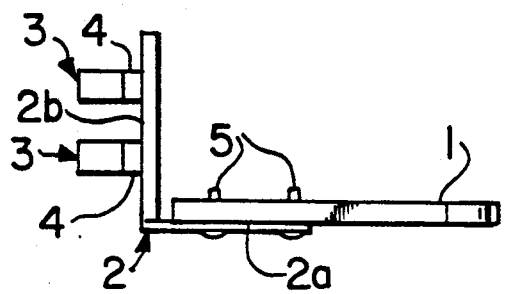
FIG. 1 is a side view of one embodiment of the invention.
Figure 2:
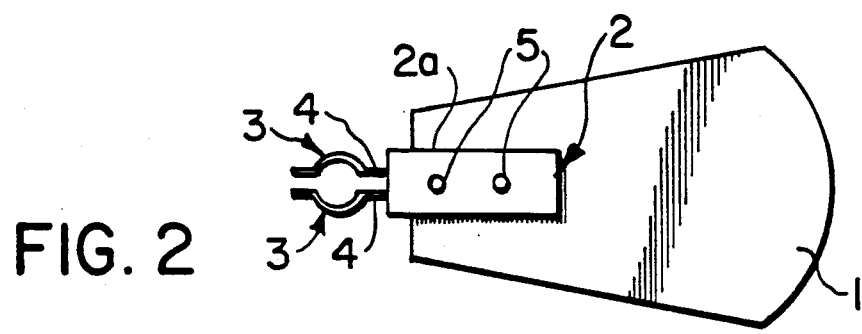
FIG. 2 is a bottom plan view of the embodiment in FIG. 1.

As illustrated in FIGS. 1 and 2, a shield comprises a shield member 1, in the example, a flat plate of material which is transparent, for example, of the material LEXAN (trade mark). This material is a strong, transparent plastic In the example shown, the shield member is tapered outwardly from a narrow, inner end to a wider, outer end, and the outer end can be arcuate, as seen in FIG. 2.

At the narrow end the shield member 1 is attached to a generally L-shaped bracket 2. The bracket 2 is attached by bolts and nuts 5 passing through holes in one arm 2a of the bracket 2, and through matching holes in the shield member 1. On the other arm 2b of the bracket 2 are attached two spring clip or mounting members 4, as by welding, for example. The spring chip members are insulated at points 3 to prevent damage to a line stick.

Figure 3:
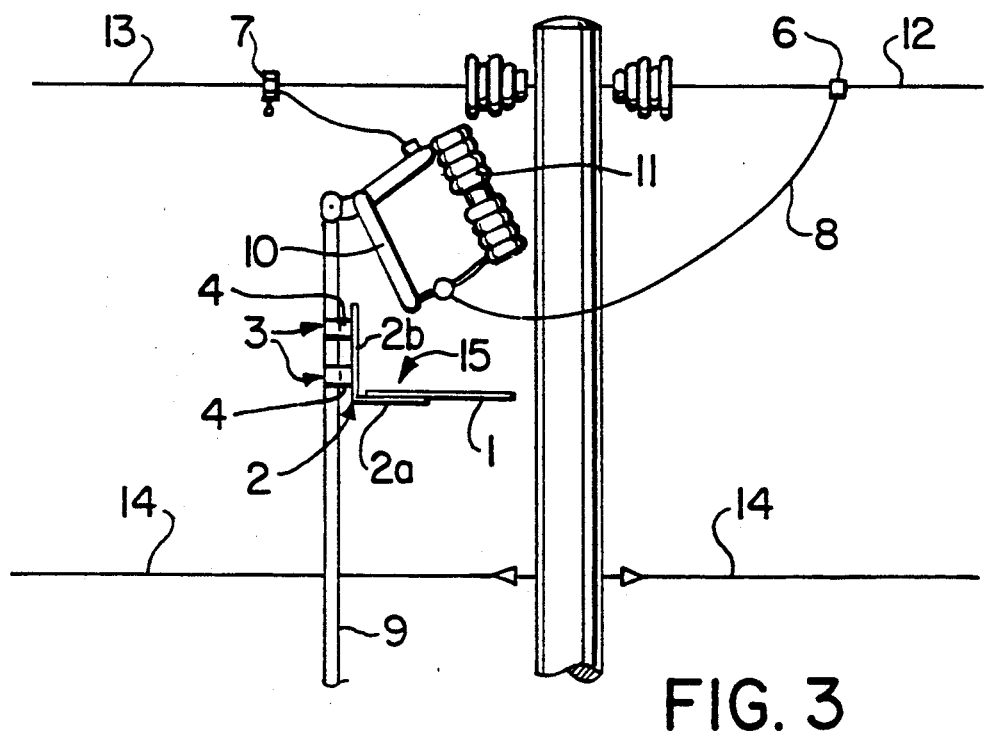
FIG. 3 illustrates the use of the device of the present invention for repairing a high voltage distribution line.

The use of the invention is illustrated in FIG. 3. A copper alloy connector 6 is attached to a high voltage electric distribution line 12, and is connected with a conductor 8 to one end of a cut-out assembly 11. A hot-tap 7 is attached to another high voltage electric distribution line 13, the tap 7 being connected by a conductor to the other end of the cut-out assembly 11. The cut-out door 10 can be "opened" to isolate line 12 from line 13. A neutral line is shown at 14.

A conventional form of line stick is indicated by reference numeral 9, with the shield or protector at 15. In use, under overload conditions, if a fuse blows, the door 10 opens. The linesman climbs the distribution line pole, or is otherwise raised, to replace the fuse and close the door 10. As the door 10 is closed, the shield member 1 is directly below the cut-out door 10. If, as the door 10 is closed, the fuse is ejected or is blown out or explodes, the shield member 1 shields the linesman against debris and the like.

The linesman can see the cut-out assembly 11, and particularly, the cut-out door 10, through the shield member 1. The position of the shield member 1 on the line stick 9 can be varied. Preferably, the shield member 1 should be a short distance, for example, a few inches, below the bottom of the cut-out door 10 when the line stick 9 has closed the cut-out door 10.

The actual shape of the shield member 1 and the attachment means for attaching member 1 to a line stick 9 can vary.

The form of the cut-out assembly 11 may not be exactly as illustrated in FIG. 3, but the invention is usable in conjunction with varying forms of cut-out assemblies.

Various other changes can be made to the device of the present invention, without departing from the spirit and scope thereof.

I claim:

1. A fuse fault safety device, for use in working on high voltage distribution lines, comprising;
   a transparent protective plate of heat and break-resistant material, said plate being in the form of an elongate body having spaced sides and opposed ends;
   a generally L-shaped bracket having first and second interconnected arms, said first arm fixedly attached to said plate adjacent one end;
   a pair of spaced-apart mounting members fixedly attached to said second arm, each mounting member extending in a direction away from said plate and having insulative and gripping surfaces for engagement with a line stick.

2. A fuse fault safety device as claimed in claim 1, wherein said mounting members are spring clips.

3. A fuse fault safety device as claimed in claim 1, wherein said plate is a generally flat planar member and said spaced sides diverge in the direction away from said bracket.

4. A line stick for use in working on high voltage distribution lines, comprising an elongate insulative pole member having opposed ends; a fuse fault safety device mounted at one end of said pole, said safety device comprising a transparent protective plate of heat and break-resistant material, said plate being in the form of an elongate body having sides and ends, a generally L-shaped bracket having first and second interconnected arms, said first arm fixedly attached to said plate adjacent one end, and a pair of spaced apart releasable mounting members fixedly attached to said second arm and extending in a direction away from said plate, said mounting members each having insulative gripping surfaces gripping said pole at said one end.

5. A line stick as claimed in claim 4, said mounting members being spring clips.

6. A line stick as claimed in claim 5 wherein said plate is a generally flat planar member and said sides diverge in the direction away from said bracket.

* * * * *